US011905034B2

(12) United States Patent
Biriuk et al.

(10) Patent No.: US 11,905,034 B2
(45) Date of Patent: Feb. 20, 2024

(54) OMNIDIRECTIONAL LIGHT DRONE SHOW

(71) Applicant: Microavia International Limited, Dublin (IE)

(72) Inventors: Ivan Biriuk, Saint Petersburg (RU); Denis Kotov, Saint Petersburg (RU)

(73) Assignee: Microavia International Limited, Dublin (IE)

(*) Notice: Subject to any disclaimer, the term of this patent is extended or adjusted under 35 U.S.C. 154(b) by 0 days.

(21) Appl. No.: 17/663,838

(22) Filed: May 18, 2022

(65) Prior Publication Data

US 2023/0373655 A1    Nov. 23, 2023

(51) Int. Cl.
| | | |
|---|---|---|
| *B64D 47/06* | (2006.01) |
| *B64C 39/02* | (2023.01) |
| *H05B 47/165* | (2020.01) |
| *H05B 47/155* | (2020.01) |
| *B64U 101/00* | (2023.01) |

(52) U.S. Cl.
CPC .......... *B64D 47/06* (2013.01); *B64C 39/024* (2013.01); *H05B 47/155* (2020.01); *H05B 47/165* (2020.01); *B64U 2101/00* (2023.01); *B64U 2201/102* (2023.01)

(58) Field of Classification Search
CPC .... B64C 39/024; B64D 47/06; H05B 47/155; H05B 47/165
See application file for complete search history.

(56) References Cited

U.S. PATENT DOCUMENTS

| | | | | |
|---|---|---|---|---|
| 2011/0018439 | A1* | 1/2011 | Fabbri | B64D 47/06 315/77 |
| 2019/0069379 | A1* | 2/2019 | Kastee | G05D 1/0027 |
| 2019/0315486 | A1* | 10/2019 | Martin | B64D 47/06 |
| 2021/0341128 | A1 | 11/2021 | Abron | |

FOREIGN PATENT DOCUMENTS

| | | |
|---|---|---|
| CN | 110641715 A | 1/2020 |
| CN | 113917944 A | 1/2022 |
| CN | 215753057 U | 2/2022 |
| CN | 114326782 A | 4/2022 |
| CN | 218641076 U | 3/2023 |
| CN | 116198737 A | 6/2023 |
| WO | WO2018058297 A1 | 4/2018 |

OTHER PUBLICATIONS

European Search Report EP22020585, dated Aug. 18, 2023.

\* cited by examiner

*Primary Examiner* — Evan P Dzierzynski
*Assistant Examiner* — Nathaniel J Lee
(74) *Attorney, Agent, or Firm* — ESPE Legal Consultancy FZ-LLC

(57) ABSTRACT

A system for displaying an omnidirectional light show for an unmanned aerial vehicle (UAV) is disclosed herein. The system comprises an LED matrix comprising a plurality of LEDs distributed on the outer surface area of a body of the UAV. A Ground Control Station (GCS) is communicatively coupled to the UAV and is configured to transmit at least one flight program and at least one light program, wherein the at least one flight program and the at least one light program are synchronized in time and events. A LED light control unit is configured on the UAV and is communicatively coupled to the GCS for receiving instructions from the GCS to control a plurality of LED parameters in accordance with the at least one flight program and the at least one light program.

20 Claims, 4 Drawing Sheets

OMNIDIRECTIONAL LIGHT DRONE SHOW

FIELD OF THE INVENTION

The invention pertains to the field of unmanned aerial vehicles, and in particular the invention pertains to a system and method for displaying an omnidirectional light show using unmanned aerial vehicles.

BACKGROUND OF THE INVENTION

Unmanned Aerial Vehicles (UAVs) are typically provided with light sources such as light-emitting diodes (LEDs) for providing indications when flying in poor lighting conditions such as at night or in weather conditions that cause poor visibility, as per the requirements of standards and requirements for aircrafts. Typically, these light sources are provided to indicate or enhance visibility of the UAV for observers at ground level or at a height greater than that at which the UAV is flying, e.g., observers traveling in planes or helicopters or those located on highrise buildings. While the LEDs mentioned above are equipped to provide indications in poor visibility, these LEDs and the UAVs are not equipped for special applications, such as light shows and geolocation indication for large aircrafts, including aircraft, satellites, helicopters and others. One reason for this is that such applications require controlling the direction and brightness of the light flux from the light sources on the UAVs with minimal power consumption for long-term and long-range flight missions.

As such, there is a need for a system that provides light indication in multiple directions with sufficient brightness for providing contrast perception over long distances and in various weather conditions.

SUMMARY OF THE INVENTION

The present disclosure describes a system for displaying an omnidirectional light show for an unmanned aerial vehicle (UAV). The system comprises an LED matrix comprising a plurality of LEDs distributed on the outer surface area of a body of the UAV. A Ground Control Station (GCS) is communicatively coupled to the UAV and is configured to transmit at least one flight program and at least one light program, wherein the at least one flight program and the at least one light program are synchronized in time and events. A LED light control unit is configured on the UAV and is communicatively coupled to the GCS for receiving instructions from the GCS to control a plurality of LED parameters in accordance with the at least one flight program and the at least one light program.

In an alternative embodiment, the distribution of the plurality of LEDs on the outer surface area includes distribution on at least a portion of the outer surface area and distribution along a complete outer surface area.

In an alternative embodiment, the plurality of LED parameters includes direction of glow of the plurality of LEDs, intensity of the plurality of LEDs, ON/OFF signals for the plurality of LEDs, and switching mode for the plurality of LEDs.

In an alternative embodiment, the LED light control unit is at least one of a standalone controller, an expansion board, and a set of instructions.

In an alternative embodiment, the system further comprises at least one optical device for controlling an optical rendering from the plurality of LEDs.

In an alternative embodiment, the intensity of the plurality of LEDs is controlled based on a time stamp of an event, geolocation of the UAVs with respect to a position of the observer, and external weather conditions.

In an alternative embodiment, the intensity of the plurality of LEDs is controlled based on the geolocation of the UAVs with respect to a varying position of the observer, wherein the data associated with the varying position of the observer is fed to the LED light control unit by the GCS in real time.

In an alternative embodiment, the direction of glow of the plurality of LEDs is controlled based on a time stamp of an event and geolocation of the UAVs with respect to a position of the observer.

In an alternative embodiment, the direction of glow of the plurality of LEDs is controlled based on the geolocation of the UAVs with respect to a varying position of the observer, wherein the data associated with the varying position of the observer is fed to the LED light control unit by the GCS in real time.

In an alternative embodiment, different LEDs of the LED matrix having the same intensity are configured to be oriented in the same direction.

In an alternative embodiment, the LED matrix includes an integrated LED matrix controller.

The present disclosure also envisages a method for displaying an omnidirectional light show for an unmanned aerial vehicle (UAV). The method comprises providing an LED matrix comprising a plurality of LEDs distributed on outer surface area of a body of the UAV; transmitting, from a Ground Control Station (GCS) to the UAV, information associated with at least one flight program and at least one light program, wherein the at least one flight program and the at least one light program are synchronized in time and events; and receiving instructions at a LED light control unit configured on the UAV from the GCS for controlling a plurality of LED parameters in accordance with the at least one flight program and the at least one light program.

In an alternative embodiment, the distribution of the plurality of LEDs on the outer surface area includes distribution on at least a portion of the outer surface area and distribution along a complete outer surface area.

In an alternative embodiment, the plurality of LED parameters includes direction of glow of the plurality of LEDs, intensity of the plurality of LEDs, ON/OFF signals for the plurality of LEDs, and switching mode for the plurality of LEDs.

In an alternative embodiment, the LED light control unit is at least one of a standalone controller, an expansion board, and a set of instructions.

In an alternative embodiment, the method further comprises providing at least one optical device on the UAV for controlling an optical rendering from the plurality of LEDs.

In an alternative embodiment, the intensity of the plurality of LEDs is controlled based on a time stamp of an event, geolocation of the UAVs with respect to a position of the observer, and external weather conditions.

In an alternative embodiment, the intensity of the plurality of LEDs is controlled based on the geolocation of the UAVs with respect to a varying position of the observer, wherein the data associated with the varying position of the observer is fed to the LED light control unit by the GCS in real time.

In an alternative embodiment, the direction of glow of the plurality of LEDs is controlled based on a time stamp of an event and geolocation of the UAVs with respect to a position of the observer.

In an alternative embodiment, the direction of glow of the plurality of LEDs is controlled based on the geolocation of the UAVs with respect to a varying position of the observer, wherein the data associated with the varying position of the observer is fed to the LED light control unit by the GCS in real time.

DETAILED DESCRIPTION

Figure 1:
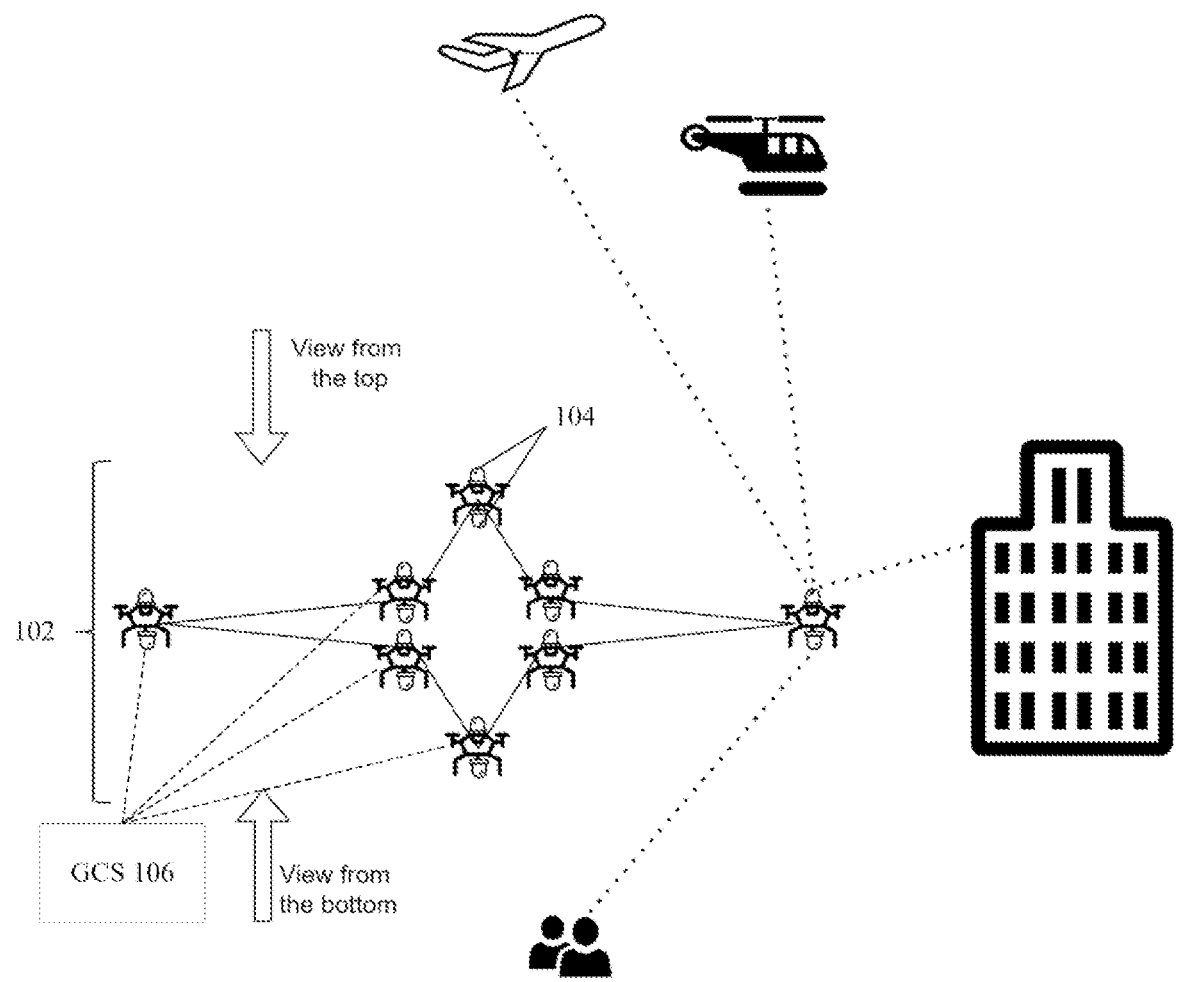
FIG. 1 illustrates a schematic view of a system for omnidirectional light show, in accordance with an embodiment of the present disclosure.

FIG. 1 illustrates a schematic view of a system for omnidirectional light show (hereinafter referred to as system 100) for an Unmanned Aerial Vehicle (UAV) 102, in accordance with an embodiment of the present disclosure. In accordance with an embodiment of the present subject matter, the system 100 employs a plurality of UAVs 102 for conducting the omnidirectional light show. The UAVs 102, in accordance with the present disclosure, are designed with multiple light sources to ensure that the light flux from the UAV can be directed in multiple directions to ensure the omnidirectionality of the present system 100. The schematic exemplary construction of the UAV 102, in accordance with the present disclosure, is described in the subsequent sections of the present disclosure. As seen in FIG. 1, the system 100 is configured to provide a light show or geolocation indication to observers at multiple different locations such as at ground level, or on a highrise building, or a helicopter or plane traveling at a height greater than that of the light show. More specifically, the system 100 is configured to arrange the UAVs 102 in accordance with the observer position to best display the light show or geolocation indication to the required observer (humans at ground level or on high buildings or other aircrafts) no matter at what height they are located.

Figure 2:
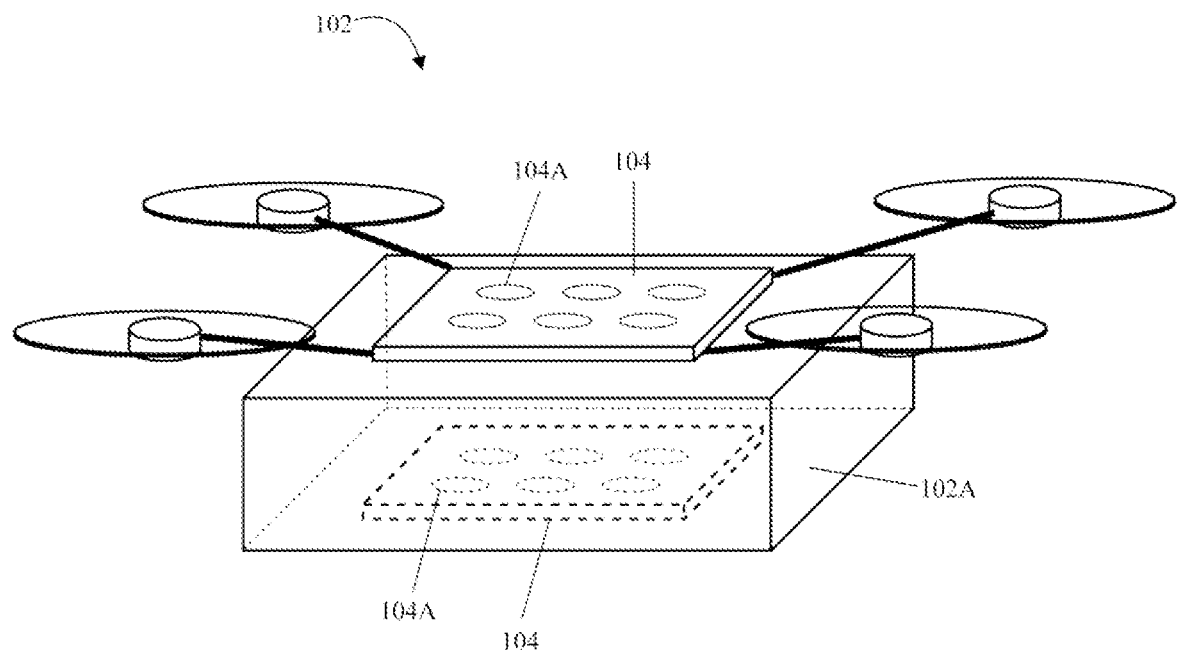
FIG. 2 illustrates a schematic view of an unmanned aerial vehicle (UAV) used in the system, in accordance with an embodiment of the present disclosure.

In one embodiment, the system 100 comprises an LED matrix 104 comprising a plurality of LEDs 104A distributed on outer surface area of a body 102A of the UAV 102 (as seen in FIG. 2). FIG. 2 illustrates a schematic view of the unmanned aerial vehicle (UAV) 102 used in the system, in accordance with an embodiment of the present disclosure. In an embodiment, as seen in FIG. 2, wherein the body 102A has a rectangular cross section, the plurality of LEDs 104A are distributed along the top and bottom faces thereof. These LEDs allow the UAVs 102 to provide a light show to observers that are above the height of the UAV 102 as well as to those observers that are below the height of the UAV 102. In some embodiments, the LEDs 104A are provided on all the faces of such a body. In another embodiment, wherein the body has a spherical or an elliptical configuration, the LEDs 104A are distributed in an equidistant manner along the entire surface area thereof. In one embodiment, it is envisaged that the LEDs 104A are provided on a partial surface area of the body of the UAV. In another embodiment, it is envisaged that the LEDs 104A are provided on a complete surface area of the body of the UAV.

The system 100 further comprises a Ground Control Station (GCS) 106 that is communicatively coupled to the UAV 102 and is configured to transmit at least one flight program and at least one light program, wherein the at least one flight program and the at least one light program are synchronized in time and events. The flight program is configured to control the flight of the UAVs 102 for ensuring that the UAVs 102 are arranged to fly appropriately depending on the position of the observer. The light program is synchronized in time and events with the flight program, and therefore, the light program dictates the operation of the LEDs 104A on the UAVs 102 for presenting the light show.

The system 100 further comprises a LED light control unit 108 that is configured on the UAV 102 and is communicatively coupled to the GCS 106 for receiving instructions from the GCS to control a plurality of LED parameters in accordance with the at least one flight program and the at least one light program. In an embodiment, the plurality of LED parameters includes direction of glow of the plurality of LEDs 104A, intensity of the plurality of LEDs 104A, ON/OFF signals for the plurality of LEDs 104A and switching mode for the plurality of LEDs (flickering, constant glow, blinking, gradient change in the color of the glow). In one embodiment, the LED light control unit 108 is at least one of a standalone controller, an expansion board, and a set of instructions (executable on a controller).

In one embodiment, the LED light control unit 108 controls the operation of the LEDs 104A according to the selected light program. For example, the LED control unit 108 is configured to switch on the LEDs 104A depending on the timestamp of the flight program or geolocation of the UAVs 102. In one embodiment, the LED light control unit 108 is configured to change the brightness or intensity of the LEDs 104A depending on external weather factors; change the brightness depending on the distance to the observer (airplane, helicopter, floor of a skyscraper). In one embodiment, the LED light control unit 108 is configured to change the direction of glow of the LEDs 104A to direct the glow depending on the point of the observer (for example, tracking the geoposition of a helicopter approaching a group of drones or glowing towards a stationary observer when a group of drones move in space). In one embodiment, the LED light control unit 108 is configured to change the brightness depending on the illumination; change the brightness and colors depending on the timestamp of the flight program. In one embodiment, the LED light control unit 108 is configured to switch modes depending on the time stamp or geolocation of the drone (flickering, constant glow, blinking, gradient change in the color of the glow).

In an embodiment, the intensity and direction of glow of the plurality of LEDs 104 is controlled by the LED control unit 108 based on a time stamp of an event, geolocation of the UAVs with respect to a position of the observer, and external weather conditions. In an embodiment, the position of the observer may be varying, e.g., in case of displaying geolocations to aircrafts. In such a scenario, the data associated with the varying position of the observer is fed to the LED light control unit 108 by the GCS 106 in real time, which allows the LED light control unit 108 to control the intensity and direction of glow of the LEDs 104A to ensure that the moving observer has the best possible view of the required indication or light show. In yet another embodiment, different LEDs 104A of the LED matrix 104 having the same intensity are configured to be oriented in the same direction.

Figure 3:
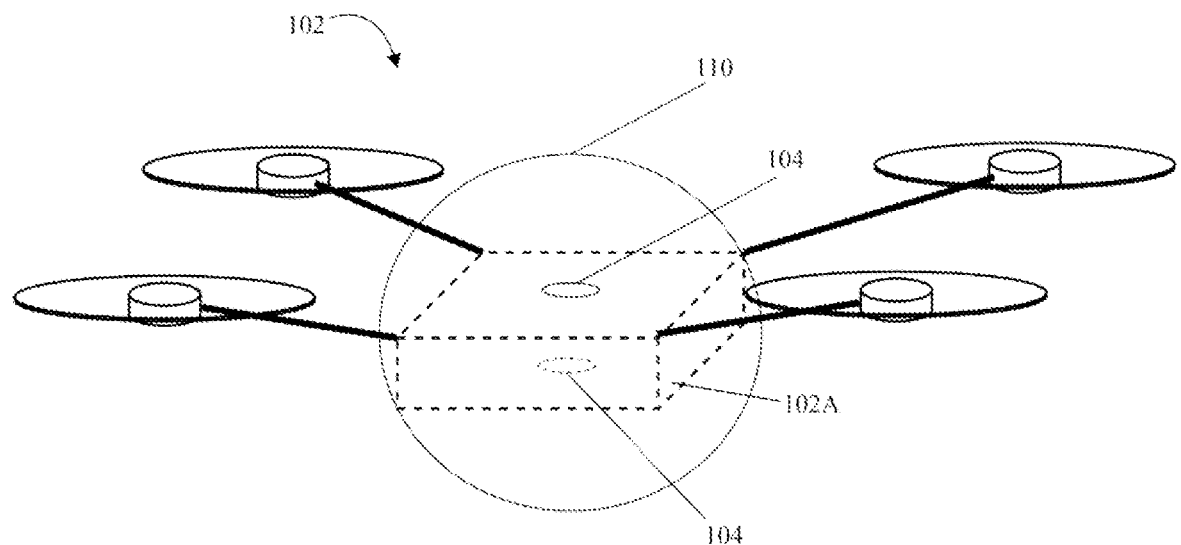
FIG. 3 illustrates another schematic view of an unmanned aerial vehicle (UAV) used in the system, in accordance with an embodiment of the present disclosure.

FIG. 3 illustrates another schematic view of the unmanned aerial vehicle (UAV) 102 used in the system, in accordance with an embodiment of the present disclosure. As seen in FIG. 3, the system 100 further comprises at least one optical device 110 for controlling an optical rendering from the plurality of LEDs 104A. More specifically, the optical device 110 is a diffuser in one exemplary embodiment. The diffuser facilitates the diffusion of light fluxes from several LEDs 104A and forms a single light flux from the UAV 102, rather than several single streams from each LED 104A on the UAV 102. In another embodiment, the optical device 110 can be a lens or a combination of multiple lenses or a combination of lenses and diffusers, wherein such a configuration of the optical devices is employed for facilitating desired optical rendering of light from the LEDs 104A according to the selected light program.

Figure 4:
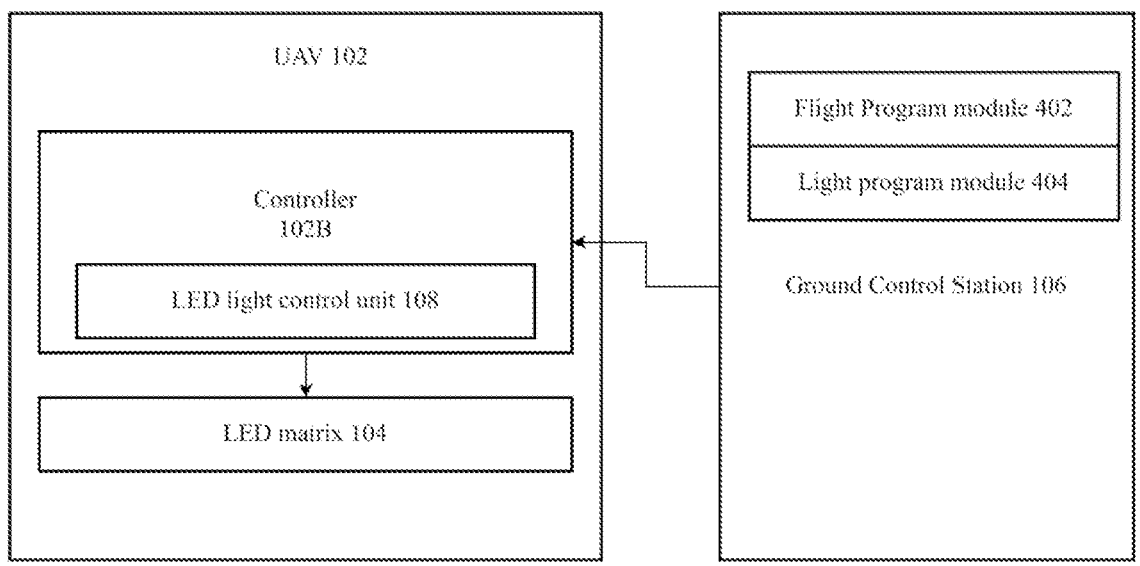
FIG. 4 illustrates a block diagram of the system for omnidirectional light show, in accordance with an embodiment of the present disclosure.

FIG. 4 illustrates a block diagram of the system 100, in accordance with an embodiment of the present disclosure. As seen in FIG. 4, the flight program module 402 and the light program module 404 are configured at the GCS 106. The user can select the desired flight program and light program at the GCS 106, wherein the flight program and the light program are synchronized in time and events. The system 100 includes UAVs 102. Each UAV 102 includes a controller 406. The system 100 further comprises the LED light control unit 108. In one embodiment, the LED light control unit 108 is a set of instructions executable by the controller 406. As mentioned previously, the LED light control unit 108 is configured to control the LED matrix 104 to control a plurality of LED parameters including direction of glow of the plurality of LEDs 104A, intensity of the plurality of LEDs 104A, ON/OFF signals for the plurality of LEDs 104A and switching mode for the plurality of LEDs (flickering, constant glow, blinking, gradient change in the color of the glow). In an embodiment, the LED matrix 104 includes an integrated LED matrix controller to control the LED matrix 104 through one physical communication channel, or each LED 104A can be connected to a separate control pin (separate communication channel). In the former scenario, a digital signal is applied to the LED matrix 104 encoding the glow level and light for each addressable LED 104A, whereas in the latter scenario, it can be done either via a digital or an analog control signal.

Figure 5:
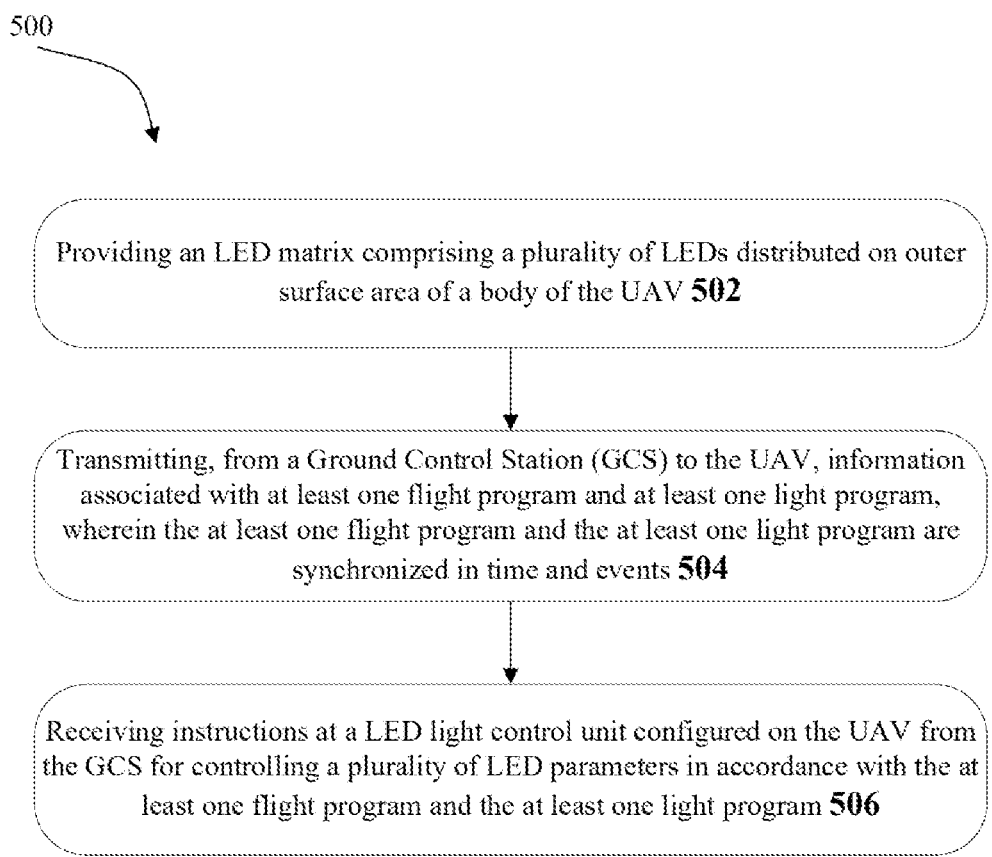
FIG. 5 illustrates a block diagram of the method for omnidirectional light show, in accordance with an embodiment of the present disclosure.

FIG. 5 illustrates a block diagram of the method for omnidirectional light show 500 (hereinafter referred to as method 500), in accordance with an embodiment of the present disclosure. The order in which the method 500 is described is not intended to be construed as a limitation, and any number of the described method blocks can be combined in any order to implement the method or similar alternative methods. Additionally, individual blocks can be deleted from the method without departing from the spirit and scope of the subject matter described herein. Furthermore, the method can be implemented in any suitable hardware, software, firmware, or combination thereof.

At block 502, the method 500 includes the step of providing an LED matrix 104 comprising a plurality of LEDs 104A distributed on the outer surface area of a body 102A of the UAV 102. In one embodiment, the plurality of LEDs 104A are provided on one or more portions of the outer surface area of the body 102A of the UAV. More specifically, in one embodiment, the LEDs 104A are provided on top and bottom outer surfaces of the UAV body, wherein the body has a rectangular cross section. In another embodiment, the LEDs 104A are provided on all faces of the rectangular body 102A of the UAV 102. In another embodiment, the body has a spherical or elliptical configuration, and the LEDs 104A are configured in an equidistant configuration along an entire surface area of the body.

At block 504, the method 500 includes transmitting, from a Ground Control Station (GCS) 106 to the UAV 102, information associated with at least one flight program and at least one light program, wherein the at least one flight program and the at least one light program are synchronized in time and events.

At block 506, the method 500 includes receiving instructions at a LED light control unit 108 configured on the UAV 102 from the GCS 106 for controlling a plurality of LED parameters in accordance with the at least one flight program and the at least one light program. In an embodiment, the plurality of LED parameters includes direction of glow of the plurality of LEDs, intensity of the plurality of LEDs, ON/OFF signals for the plurality of LEDs, and switching mode for the plurality of LEDs.

In an alternative embodiment, the intensity and direction of glow of the plurality of LEDs 104A is controlled based on a time stamp of an event, geolocation of the UAVs 102 with respect to a position of the observer, and external weather conditions. In an alternative embodiment, the direction of glow and intensity of the plurality of LEDs 104A is controlled based on the geolocation of the UAVs 102 with respect to a varying position of the observer, wherein the data associated with the varying position of the observer is fed to the LED light control unit 102 by the GCS 106 in real time.

A typical operation of the system 100 in accordance with the method 500 is described herein. In one embodiment, the GCS 106 sends control signals to the UAVs 102 to activate the UAVs 102, and after the activation of the UAVs 102, information associated with the light program and flight program are transmitted to the UAVs 102. In one embodiment, the activation of the UAVs 102 is indicated by flickering of one LED on the UAV for indicating the readiness of the UAVs 102 to take off a flight in accordance with the selected flight program. In another embodiment, the flight of the UAVs 102 is accompanied by flickering of a red LED on the top and bottom surfaces of the UAV 102 during takeoff. Such a red indication is to make the relevant observers aware of the position of the UAVs 102, in accordance with one implementation. Such indications of the UAV 102 are performed by the LED light control unit 108, in accordance with one embodiment of the present disclosure.

In accordance with the instant implementation, the LED light control unit 108 is configured to turn off all the indications once the UAVs 102 reach the starting point where the light show is conducted. The GCS 106 is configured to track the geopositions of the UAVs 102, and once the geoposition of the UAVs 102 reaches or coincides with the geoposition of the starting point for the light show, the indicator lights of the UAVs 102 are turned off by the LED light control unit 108.

After reaching the starting point of the light show, the indication lights are turned off. The turning off the indication lights can be momentary, in accordance with one implementation. The turning off the indication lights itself is an indicator that the light show is about to begin. As such, at this stage the LEDs 104A of the UAV 102 are turned on by the LED light control unit 108 and controlled in accordance with the light program. It is to be noted that the starting point of the light show is typically selected or computed based on the location/position of the observer.

As mentioned previously, the present system and corresponding method can be used to display a light show to any observer irrespective of the height at which the observer is located following the omni directionality provided by the plurality LEDs 104A distributed about the entire body of the UAVs 102. More specifically, to the observer located below the height of the UAVs 102, the LEDs 104A provided on the bottom surface may be activated according to the light program to display the light shows to the observers positioned below. Similarly, if the observers are located at a location above the height of the UAVs 102, e.g., on a highrise building or aircrafts needing geoposition indications, the LEDs 104A provided on the top of the UAV body may be activated for displaying the required light show to the observer in accordance with the light program.

After the light show is initiated, the LEDs 104A are operated in accordance with the light program in which different tasks of the LEDs 104A are performed synchronously with the corresponding flight tasks of the UAV 102 in accordance with the flight program. One example of this phenomenon is that brightness of the LEDs 104A may be made high at the beginning of the light show when the UAVs 102 are at a greater distance from the observer. Therefore, when the light program and flight program are in synchrony, this brightness can be reduced as the distance between the observer and the UAVs 102 is reduced. For such synchronization, the real time tracking of the geopositions of the UAVs 102 and the observer is required. In one embodiment, the GCS 106 is configured to perform or facilitate such real time tracking by communicating with the UAVs 102.

Another exemplary application of synchrony in light program and flight program is to control the direction of the glow of the LEDs 104A. More specifically, the direction of glow of the LEDs 104A is controlled by switching on those LEDs 104A on the UAV 102 that are directly facing the observer. The LED light control unit 108 is configured to identify the LEDs 104A directly facing the observer based on the positions of the observer relative to the geoposition of the UAVs 102. The geopositions of the UAVs 102 is dependent on the flight program, whereas the selection of a group of LEDs 104A for activation to control the glow direction of the LEDs 104A is performed by the LED light control unit 108 based on the light program.

Also, the LED light control unit 108 is further configured to change in the brightness of the LEDs 104A depending on environmental factors. More specifically, the LEDs 104A are configured to shine more brightly in bad weather conditions such as in fog. The LED light control unit 108 is further configured to control the LEDs 104A based on the battery charge of the UAV 102. More specifically, if it is sensed that the battery is low, the brightness of the LEDs 104A can be systematically and gradually reduced for prolonging the light show.

After the light show in accordance with the light program is concluded, the UAVs 102 are configured to land in accordance with the flight program.

The advantageous aspect of the system and method for displaying an omnidirectional light show, in accordance with an embodiment of the present disclosure, is that no matter at what height the observer is positioned, the same system and method can be used to optimally present a light show to the observer using the plurality of UAVs at different heights, wherein the observer can be located at a height greater than the UAVs, or at a height equal to that of UAVs, or at a height less than that of the UAVs. Furthermore, the usage of the GCS facilitates real time monitoring of the geopositions of the UAVs, the positions of the observers, and accordingly control the operation of the LEDs 104A to control the direction of glow, intensity, and activation/deactivation of the LEDs.

The invention claimed is:

1. A system for displaying an omnidirectional light show for an unmanned aerial vehicle (UAV) with a geoposition, to an observer with a position, the system comprising:
    a UAV comprising an outer surface area with a top and a bottom, further comprising an LED matrix comprising a plurality of LEDs distributed on the top and bottom surface area of the UAV;
    a Ground Control Station (GCS) communicatively coupled to the UAV, wherein the GCS is configured to:
        transmit a flight program and a light program, wherein the flight program and light program are synchronized in time and events to track the geoposition of the UAV and to track the position of the observer;
    a controller configured on the UAV and communicatively coupled to the GCS for receiving and executing the flight program; and
    an LED light control unit on the UAV communicatively coupled to the controller and the GCS for receiving the light program from the GCS and to control a plurality of LED parameters in accordance with the light program.

2. The system of claim 1, wherein the distribution of the plurality of LEDs on the outer surface area includes distribution in an equidistant manner along the top and bottom of the outer surface area.

3. The system of claim 1, wherein the plurality of LED parameters includes a direction of glow of the plurality of LEDs, an intensity of the plurality of LEDs, ON/OFF signals for the plurality of LEDs, and a switching mode for the plurality of LEDs, wherein the switching mode comprises flickering, constant glow, blinking, or gradient change in the color of the glow.

4. The system of claim 3, wherein the intensity of the plurality of LEDs is controlled based on the geoposition of the UAV with respect to a position of the observer.

5. The system of claim 3, wherein the intensity of the plurality of LEDs is controlled based on the geoposition of the UAV with respect to a varying position of the observer, wherein the data associated with the varying position of the observer is fed to the LED light control unit by the GCS in real time.

6. The system of claim 3, wherein the direction of glow of the plurality of LEDs is controlled based on a time stamp of an event and the geoposition of the UAV with respect to the position of the observer.

7. The system of claim 3, wherein the direction of glow of the plurality of LEDs is controlled based on the geoposition of the UAV with respect to the position of the observer, wherein the data associated with the varying position of the observer is fed to the LED light control unit by the GCS in real time.

8. The system of claim 3, wherein different LEDs of the LED matrix having same intensity are configured to be oriented in the same direction.

9. The system of claim 1, wherein the LED light control unit is a standalone controller, an expansion board, or a set of instructions.

10. The system of claim 1, further comprising an optical device for controlling an optical rendering from the plurality of LEDs.

11. The system of claim 1, wherein the LED matrix includes an integrated LED matrix controller.

12. A method for displaying an omnidirectional light show by an unmanned aerial vehicle (UAV), the UAV having a geolocation, to an observer at a position, the method comprising:
   providing an LED matrix comprising a plurality of LEDs distributed on an outer surface area of the UAV comprising a top and bottom;
   transmitting, from a Ground Control Station (GCS) to the UAV, information associated with a flight program and a light program, wherein the flight program and the light program are synchronized in time and events;
   tracking by the GCS the geolocation of the UAV;
   tracking by the GCS the position of the observer;
   receiving and executing the flight program at a controller on the UAV;
   receiving from the GCS the flight program at a second controller comprising an LED light control unit configured on the UAV; and
   controlling a plurality of LED parameters in accordance with the flight program and the light program.

13. The method of claim 12, wherein the distribution of the plurality of LEDs on the outer surface area includes distribution on a portion of the outer surface area and distribution along a complete outer surface area.

14. The method of claim 12, wherein the plurality of LED parameters includes direction of glow of the plurality of LEDs, an intensity of the plurality of LEDs, ON/OFF signals for the plurality of LEDs, and a switching mode for the plurality of LEDs, wherein the switching mode comprises flickering, constant glow, blinking, or gradient change in the color of the glow.

15. The method of claim 14, wherein the intensity of the plurality of LEDs is controlled based on the geolocation of the UAV with respect to the position of the observer.

16. The method of claim 14, wherein the intensity of the plurality of LEDs is controlled based on the geolocation of the UAV with respect to the varying position of the observer, wherein the data associated with the varying position of the observer is fed to the LED light control unit by the GCS in real time.

17. The method of claim 14, wherein the direction of glow of the plurality of LEDs is controlled based on the geolocation of the UAV with respect to the position of the observer.

18. The method of claim 14, wherein the direction of glow of the plurality of LEDs is controlled based on the geolocation of the UAV with respect to the varying position of the observer, wherein the data associated with the varying position of the observer is fed to the LED light control unit by the GCS in real time.

19. The method of claim 12, wherein the LED light control unit is a standalone controller, an expansion board, or a set of instructions.

20. The method of claim 12, further comprising providing an optical device on the UAV for controlling an optical rendering from the plurality of LEDs.

* * * * *